United States Patent [19]

Odnert et al.

[11] Patent Number: 5,278,985
[45] Date of Patent: Jan. 11, 1994

[54] SOFTWARE METHOD FOR IMPLEMENTING DISMISSIBLE INSTRUCTIONS ON A COMPUTER

[75] Inventors: Daryl K. Odnert, Palo Alto; Michael J. Mahon, San Jose; Dale C. Morris, Menlo Park; Jerome C. Huck, Palo Alto; Ruby B. Lee, Los Altos Hills; Stephen G. Burger, Santa Clara; William R. Bryg, Saratoga; Vivek S. Pendharkar, Santa Clara, all of Calif.

[73] Assignee: Hewlett-Packard Company, Palo Alto, Calif.

[21] Appl. No.: 606,711

[22] Filed: Oct. 31, 1990

[51] Int. Cl.[5] .............................. G06F 9/32; G06F 9/30
[52] U.S. Cl. ................................. 395/700; 364/261.6; 364/281.9; 364/285.2; 364/285.3; 364/DIG. 1
[58] Field of Search ........................................ 395/700

[56] References Cited

U.S. PATENT DOCUMENTS

| 4,074,353 | 2/1978 | Woods et al. ............... 364/200 |
| 4,080,650 | 3/1978 | Beckett ......................... 364/200 |
| 5,034,880 | 7/1991 | Fong et al. .................... 364/200 |

Primary Examiner—Gareth D. Shaw
Assistant Examiner—A. Katbab
Attorney, Agent, or Firm—Roland I. Griffin; Alan H. Haggard

[57] ABSTRACT

A method for operating a digital computer in response to the occurrence of an exception is disclosed. The method provides for the examination both of the contents of a predetermined computer location and of the instruction code for the instruction causing the exception. The computer then utilizes the result of those examinations to determine the dismissibility of the exception. The computer transfers control to the next instruction after the instruction which caused the exception if that instruction is dismissible.

3 Claims, 1 Drawing Sheet

SOFTWARE METHOD FOR IMPLEMENTING DISMISSIBLE INSTRUCTIONS ON A COMPUTER

FIELD OF THE INVENTION

The present invention relates to computers, and more particularly, to methods for handling exception conditions.

BACKGROUND OF THE INVENTION

Digital computers all have a supervisory program, known as an operating system, which controls the basic operations of the computer. It is the operating system which initially starts the computer operating when the computer is turned on. The operating system is a program that controls the execution of the programs that the user wishes to use, which are called application programs or simply applications. The operating system is usually invisible to the computer's user; it is the application program which the user actually observes running.

The operating system is usually designed to prevent the user from performing operations which are erroneous in some predesignated way. For example, the computer cannot divide a number by zero, since the result cannot be calculated. Such an erroneous operation generates a response known as an exception. If while running an application the operating system encounters an instruction which creates an exception, it will transfer control from the application which is being executed to a separate subroutine or program designed to handle that exception. These subroutines or programs are known as trap routines or trap handlers. Thus using the above example, if an application attempted to divide a number by zero, control of the computer would be transferred to a trap handler. Similarly, if an application tries to read from or write to a device or memory location which does not exist, the operating system will transfer control of the computer to a trap handler. Some trap handlers terminate the application program which is being executed, while others provide some type of warning message to the user.

A trap which occurs when an instruction attempts to perform some illegal operation is known as an exception trap. Exception traps can be very helpful to the computer's user, since exception traps catch inadvertent errors which may otherwise have gone unnoticed. Some such errors are otherwise undetectable by the user. Exception traps can be a hindrance, however, in cases where the application programmer knows that the exception will produce harmless results and that the instructions which create the exception are the best available for reaching that programmer's desired results.

For example, modern digital microprocessors can often perform mathematical functions much faster than they can access most commercially practical memory devices. To prevent idle processor time, programmers and optimizing compilers attempt to generate code that intersperses load instructions with computations performed on data already in the processor's internal registers. Ideally the program issues an instruction which loads data into an internal processor register and then proceeds with a calculation that involves only data currently in the internal registers. The load instruction is completed during the time period occupied by the subsequent computation. By the time the computation is completed, the data specified in the load instruction will be available for the next computation.

Consider a simple loop which add the contents of two arrays, A(i) and B(i), to produce a third array C(i) = A(i) + B(i). Here, i runs from 1 to N, where there are N elements in each of the arrays. The conventional method for coding such a loop produces code for the following operations:

(1) Load 1 into register i
(2) Load A(i) into internal register x
(3) Load B(i) into internal register y
(4) Add the contents of x and y producing a result in internal register z
(5) Store the contents of z in memory location C(i)
(6) Increment register i and branch to (2) if $i \leq N$ The above code contains two successive load instructions at steps (2) and (3), which must be completed before the instruction at step (4) can be executed. The processor must wait for the load instructions to be completed before performing the addition at step (4). During this time, the processor is idle.

The above example may be recoded in a manner that avoids much of the processor idle time as follows:

(1) Load 2 into register i
(2) Load A(1) into register x
(3) Load B(1) into register y
(4) Add the contents of x and y to produce a result in register z
(5) Load A(i) into register x
(6) Load B(i) into register y
(7) Store the contents of z at C(i-1)
(8) Increment i
(9) Branch to (4) if $i \leq N+1$ Here, the load instructions are interspersed with other instructions that can be executed while the load instructions are being completed. These loads are obtaining the values to be used in the next iteration of the loop of steps (4)–(9) in advance of actually performing the necessary addition. The problem with this method of coding the loop occurs at the last value of i. When i=N+1, the values of A(N+1) and B(N+1) will be requested. However, since there are only N elements in each of these arrays, there are no such elements in the arrays A and B. As a result, a memory exception may be generated which causes a trap. The trap handler may terminate the program, or produce some other undesirable result.

Since the contents of the illegal memory addresses are never actually used by the code, the memory violation is harmless. Unfortunately, prior art trap handlers routines have no means of ascertaining which memory violations are harmless.

One method that has been suggested for solving this problem involves defining two sets of instructions, normal instructions and dismissible instructions. An example of an instruction that might exist in both dismissible and non-dismissible forms is a load instruction. When a normal load instruction produces a trap condition, the trap operates normally. However, when a dismissible load instruction generates a trap condition, the condition is "dismissed" and the program resumes execution. Typically the dismissible instructions are distinguished from non-dismissible instructions by one bit of the instruction code. The computer hardware is designed to suppress a trap interrupt if the instruction generating the interrupt has the bit in question set to a predetermined value.

While this method of dealing with dismissible trap conditions allows the type of code described above to be used, it has a number of drawbacks. First, it can not be utilized on existing processors that do not implement these instructions in hardware. Since the indication of dismissibility of an instruction is contained in the instruction code and processed by the interrupt hardware, specially constructed processors must be utilized.

Second, two instructions must be provided for each operation that may generated a dismissible trap condition. This reduces the number of instructions that can be provided for any given instruction code length. If the instruction code length is increased to accommodate the new instructions, the amount of memory needed to store the program will increase or a fewer number of distinct operations can be described in the instruction set of the computer.

Third, the hardware designer must anticipate all instructions that may generate dismissible traps. Either the designer must be over-inclusive in designing the dismissible instruction set or the programmers will be limited in the code that can be run on the processor. If the designer is over-inclusive, processor hardware, and possible memory costs, will be increased due to increased hardware complexity. If the designer is under-inclusive, the programmer will be limited in his or her ability to provide efficient code for some task.

Finally, this approach does not allow the processor to make the decision on whether or not to dismiss an exception dependent upon the state of other registers in the processor. For example, it would be advantageous to allow the programmer to dynamically specify the dismissibility of certain classes of instructions during the execution of the code. This could be done by examining the contents of one or more registers in the computer and basing the dismissibility decision on the specific instruction causing the exception and the contents of these registers. Such conditional exception handling is difficult to implement in hardware without substantially increasing the complexity, and therefore cost, of the hardware.

Broadly, it is the object of the present invention to provide an improved method for operating a digital computer in response to an exception.

It is a further object of the present invention to provide a method of determining whether an instruction is dismissible which can be implemented on existing processors.

It is a still further object of the present invention to provide a method of operating a computer which allows a single instruction code to represent both dismissible and non-dismissible instructions which perform the same operation.

It is a yet further object of the present invention to provide a method of operating a computer which does not require that the hardware designer anticipate all instructions which may generate dismissible traps.

It is a still further object of the present invention to provide a method of operating a computer which allows the processor to determine dismissibility of an instruction in a manner that depends upon the status of computer registers or other hardware devices.

These and other objects of the present invention will be apparent to those skilled in the art from the following detailed description of the invention and the following drawings.

SUMMARY OF THE INVENTION

The present invention comprises a method for operating a digital computer in response to the occurrence of an exception. The computer examines data stored at a predetermined computer location, and also examines the instruction code of the instruction causing the exception. The computer determines whether the instruction causing the exception is dismissible, depending upon the data in question and said instruction code. The computer assigns the next instruction that would have been executed in the absence of said exception to be the next instruction to be executed, if that instruction causing the exception was determined to be a dismissible instruction. The predetermined computer location may be a computer register, including a computer register containing the memory address of the code of the instruction causing the exception. The determining step may then include comparing the contents of that register to predetermined values.

DETAILED DESCRIPTION OF THE INVENTION

Figure 1:
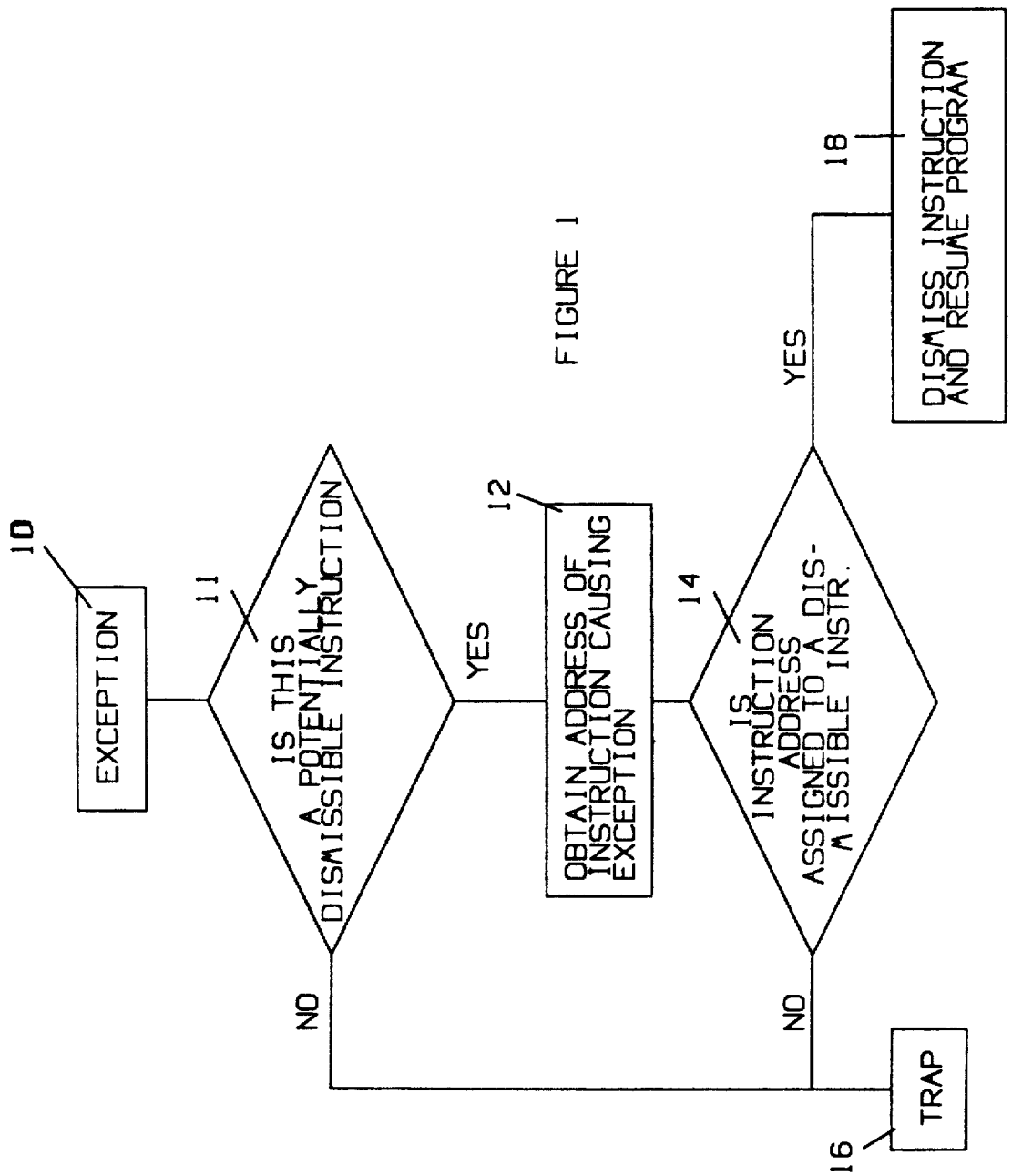
FIG. 1 is a flowchart illustrating the operation of the trap procedure of the preferred embodiment of the invention in response to an exception.

In the prior art, dismissibility is determined solely by the content of the instruction code of the instruction causing the exception. In the preferred embodiment of the present invention, dismissibility is determined both by the code and by information stored in one or more computer locations. This information can include the address of the instruction which caused the trap, or other information defined either in advance or during execution of the program. Possible computer locations include memory locations and computer internal registers.

The preferred embodiment of the present invention requires alterations to three major subprocesses involved in the creation and execution of an application program. First, the application program is written such that information regarding which instructions are dismissile is contained in the program's code. Ordinarily the programmer writes an application program in a high level computer language. These languages are designed so that the skilled programmer can create the program in a manner which that programmer can readily understand. Unfortunately, the computer cannot directly understand that language and therefore cannot run the program. Therefore a program known as a compiler is used to translate the program code written in the high level language, the source code, into a set of code which the computer can execute, the assembled code. The compiler generates within the assembled code such information as its length, where it is to be stored in memory, and other important information.

In the preferred embodiment of the present invention, the compiler designates those instructions that are dismissible. However, it will be apparent to those skilled in the art, that the programmer can also indicate which code blocks may contain instructions that are to be considered as dismissible by including appropriate compiler directives in the code.

Second, the operating system linker loads the application program into the computer's memory. The linker stores information that will allow the trap handler to determine if an instruction is dismissible. This may accomplished by storing a table of addresses of dismissible instructions or by assigning code blocks containing dismissible instructions to predetermined memory blocks.

Third, the computer begins the actual execution of the application program. The manner in which the present invention provides its advantages for execution of the application program can best be understood by examining the preferred embodiment of the invention, which is illustrated in FIG. 1. FIG. 1 is a flowchart which illustrates the manner in which a trap subroutine utilizes memory location information in responding to exceptions.

When an exception occurs, control is transferred to the trap routine. The trap routine examines the instruction to determine if it an instruction that may be dismissible as shown at 11. If the instruction is potentially dismissible, the trap routine examines the address in memory at which the instruction was stored as shown at 14. If the address of the executing instruction is not among the addresses assigned to dismissible instructions, then the trap is executed in the normal manner, as shown at 16. If the address of the executing instruction is among the addresses assigned to dismissible instructions, the exception is dismissed and the computer executes the next instruction that would have been executed had the trap not occurred, as shown at 18.

Prior to returning control to the application the trap routine may complete any operations specified by the instruction causing the exception. It may be desirable in some cases for that instruction to be executed despite the exception. In other cases the instruction may be impossible to execute. In those cases where execution of the instruction is undesirable or impossible, the computer may assign some default value for the result of the instruction, or it may ignore the instruction entirely.

The above described embodiment of the present invention utilizes the address of the instruction which caused the exception to determine if the instruction is to be dismissed. However, other methods of processing exceptions according to the present invention are possible. For example, a location that can be accessed by the trap routine itself can be utilized as a flag for indicating that all exceptions generated while the flag is set are to be dismissed. In this embodiment of the present invention, the compiler inserts a first instruction which sets the flag at the beginning of a block of code containing dismissible instructions. At the end of that code block, a second instruction that resets the flag is inserted. When an exception is encountered during execution, the trap routine checks the flag in question and dismisses the exception if the flag is set.

Implementation of this second embodiment of the present invention requires only minor changes to the compiler and trap routines. Furthermore, it does not require that the code be split between different memory blocks. However, to be successful, the frequency with which the flags are set and reset must be low to avoid wasting processor time setting and resetting the flags. It should be noted that the time needed to set and reset the flag can be minimized by using one of the internal processor registers to hold the flag.

While the above examples treat all dismissible instructions in the same manner, it will be apparent to those skilled in the art that the decision to dismiss an exception can be made such that different dismissible instructions are handled differently. In those embodiments which utilize the memory address to determine dismissibility, separate tables of addresses may be used for different classes of dismissible instructions. If flags are used, a plurality of flags may be assigned in the trap routine. In this case, the trap routine examines the instruction code of the instruction generating the exception. If the instruction is potentially dismissible, the trap examines a flag associated with that instruction type to determine if the instruction is to be dismissed.

Here, separate flag setting and resetting techniques may be utilized for each type of instruction. The instructions can be inserted through compiler directives or generated by the code in response to operating conditions present during the program's execution. In this manner, a more flexible dismissible instruction strategy may be implemented without recompiling the code.

There has been described herein a method for processing dismissible instructions. Various modifications to the present invention will become apparent to those skilled in the art from the foregoing description and the accompanying drawings. Accordingly, the present invention is to be limited solely by the scope of the following claims.

What is claimed is:

1. A method for operating a digital computer in response to the occurrence of an exception, said digital computer, in the absence of said exception, executes instructions in a predetermined sequence specified in a program stored therein, and in response to the occurrence of said exception interrupts said predetermined sequence, said computer including a plurality of storage locations and means for implementing one or more instructions, each said storage location comprising means for storing digital values and being identified by an address or register label, said method comprising:

branching to a trap routine after detecting the occurrence of said exception, wherein said trap routine causes said computer to determine whether said instruction causing said exception is dismissible, said determination depending upon the value stored at a predetermined one of said storage locations and the instruction code of said instruction causing said exception; and causing said computer to assign the instruction following said instruction causing said exception in said predetermined sequence to be the next instruction to be executed if said instruction causing said exception was determined to be a dismissible instruction.

2. The method of claim 1 wherein:

said storage value is the memory address at which said instruction causing said exception is stored; and said branching step comprises comparing said memory address to a list of predetermined memory addresses.

3. The method of claim 1, wherein:

said location is a computer register; and said step of determining if said instruction is dismissible comprises comparing said value to a plurality of predetermined values.

* * * * *